United States Patent Office 3,558,296
Patented Jan. 26, 1971

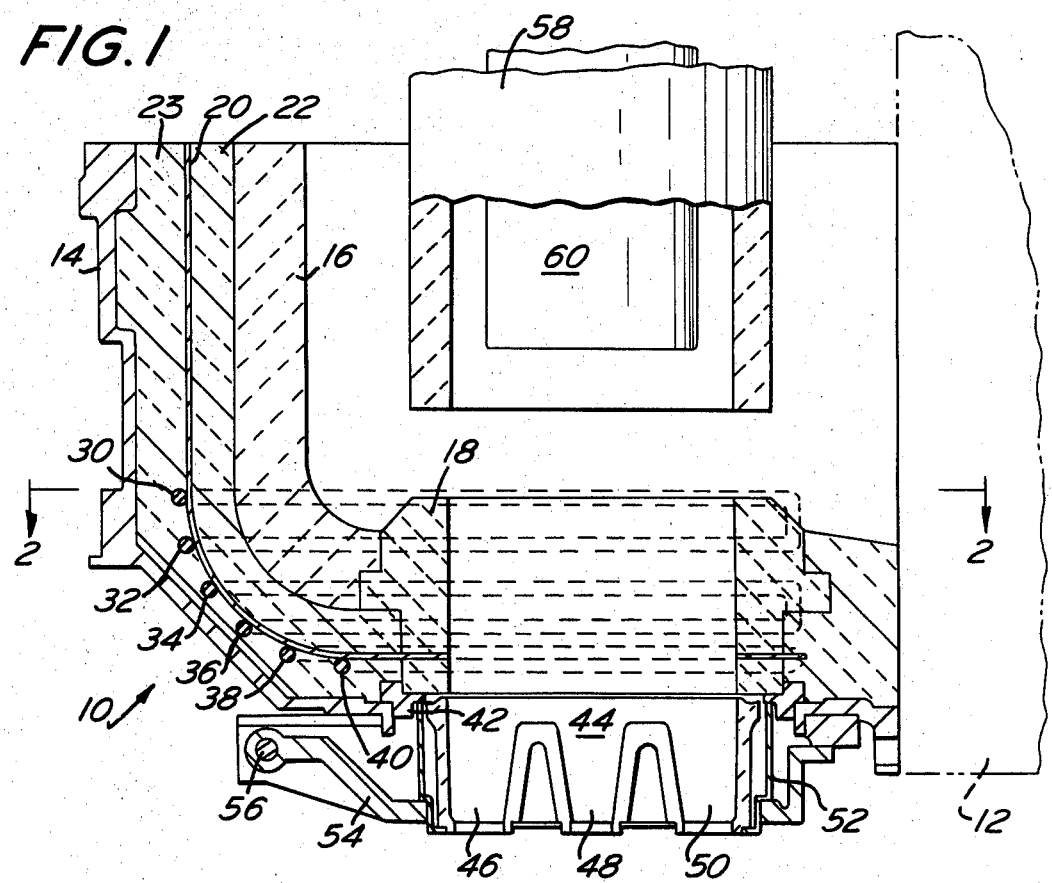
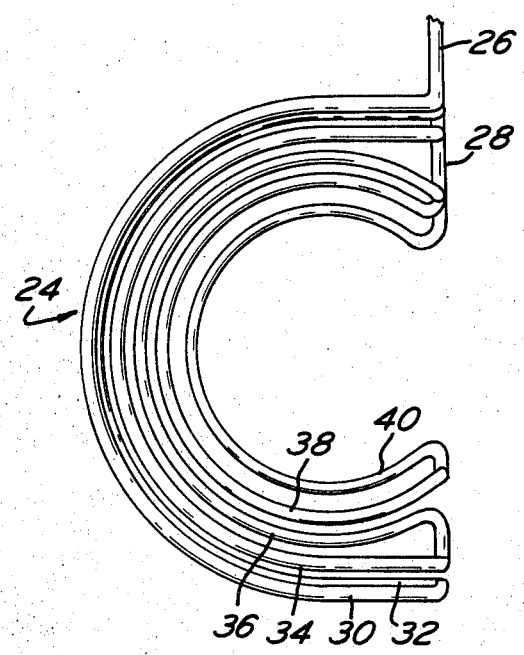

3,558,296
MOLTEN GLASS FEEDER AND METHOD OF CONTROLLING THE FLOW OF MOLTEN GLASS THERETHROUGH
Robert S. Bracken, Vineland, N.J., assignor to Maul Bros. Inc., Millville, N.J., a corporation of New Jersey
Filed May 22, 1968, Ser. No. 731,006
Int. Cl. C03b 5/16, 5/26
U.S. Cl. 65—128        6 Claims

ABSTRACT OF THE DISCLOSURE

A molten glass feeder and method of controlling the flow of glass through the feeder. The feeder has a refractory spout spaced inwardly of a casing with a heat reflecting shield interposed between the casing and spout and with electric means for heating the shield. Three streams of molten glass are discharged through an orifice ring as the shield is heated to a temperature of between 100° and 400° above the normal operating temperature of the shield resulting from the temperature of the molten glass.

---

This invention relates to a molten glass feeder, and more particularly, to a triple gob glass feeder discharge spout. Heretofore, it has been common to insulate the space between a refractory discharge spout and the spout casing. Due to splashing of coolant applied to the shear mechanism below the discharge spout, in combination with heat control problems when the orifice ring has three discharge passageways, I have found that the problems may be resolved by using a heated heat-reflecting shield between the spout casing and the refractory spout.

When a heat shield made from highly polished stainless steel is interposed between the spout casing and the refractory spout, it assumes a temperature approximating that of the refractory spout during operation, namely approximately 1000° F. By heating the shield to a temperature of about 100° F. to 400° F. above the normal temperature of the shield, it has been found that the tolerances on weight deviation for sheared gobs can be more acccurately controlled. The problems associated with weight deviation are substantially greater with a triple gob feeder due to the fact that the center stream tends to become hotter than the outside streams and thereby flows faster. It has been found that the gobs have a weight deviation of 1/32 of an ounce when utilizing the present invention in making glass bottles which heretofore had an acceptable weight deviation of 1/8 of an ounce. Thus, the present invention provides the unexpected result of reducing the weight deviation to only 25% of what was heretofore considered to be acceptable.

It is another object of the present invention to provide a novel molten glass feeder spout having a heated heat-reflecting shield.

It is another object of the present invention to provide a novel molten glass feeder which provides for more accurate control of weight deviation between gobs.

It is another object of the present invention to provide a novel glass feeder for making triple gobs with minimal weight deviation in a manner which is simple, economical, and reliable.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a vertical sectional view of a spout on a molten glass feeder in accordance with the present invention.

FIG. 3 is a top plan view of the heater coil shown in FIG. 1.

Referring to the drawing in detail, wherein like numerals indicate like elements, there is shown in FIG. 1 a discharge spout designated generally as 10 on the forehearth of a molten glass feeder.

Figure 2:
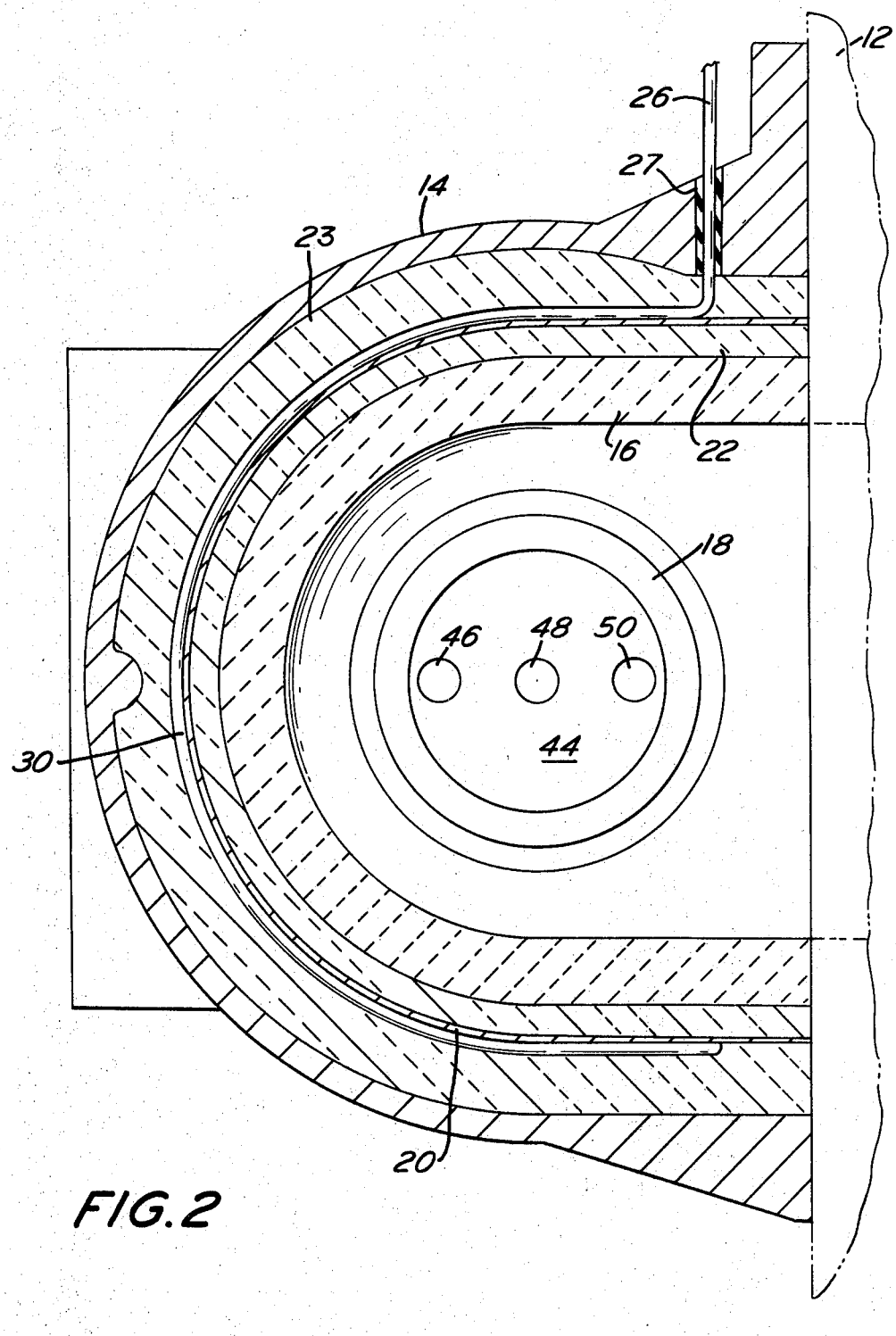
FIG. 2 is a sectional view taken along the line 2—2 in FIG. 1.

The discharge spout 10 includes an outer metallic casing 14 having a refractory spout 16 disposed therein. The refractory spout and casing are generally semi-circular in cross section as shown in FIG. 2. The spout 16 is provided at its lower end with a refractory ring 18. A heat-reflecting shield 20 is interposed between the casings 14 and 16 and above the plane of the orifice ring 44. Shield 20 is preferably made from a highly polished stainless steel.

Insulation 22 is interposed between the shield 20 and spout 16. Insulation 23 is interposed between casing 14 and shield 20. The insulation 22 and 23 may be a diatomaceous earth such as Silo-Cel powder sold commercially.

A heating coil 24 is fixedly secured to the shield 20 and lies in a plane corresponding generally to the plane of the refractory ring 18. Coil 24 may be secured to the shield 20 in any convenient manner. Preferably, securement of the coil 24 to the shield 20 is accomplished by using Thermon which is a trademark for a commercially available plastic heat conducting cement.

As shown more clearly by a comparison of FIGS. 1 and 2, the coil 24 has end portions 26 and 28 with the intermediate portion being bent into the form of semi-circular convolutions 30-40. The convolutions are progressively smaller in size so that convolution 40 is smaller than any of the convolutions 30-38, convolution 38 is smaller than any of the convolutions 30-36, etc. Insulation 27 is provided between the casing 14 and the end portions 26 and 28 of the coil.

The heat shield 20 reflects heat back toward the refractory spout 16 and the molten glass supported therein. The heating coil 24 increases the temperature of the shield 20 between 100° and 400° F. above the normal temperature of the shield. The normal temperature of the shield varies, but is generally in the area of approximately 1000° F. during operation of the feeder. By positively heating the shield 20 above its normal temperature, the molten glass is prevented from being affected by cool spots which tend to form due to ambient cooling of the casing and the spashing of coolant which is applied to the shear mechanism disposed immediately below the casing 14 but not shown in the drawing.

An expendable metal seat ring 42 is supported by the casing 14. The refractory ring 18 is supported by ring 42. An orifice ring 44 made from a refractory material is provided beneath the refractory ring 18. Ring 44 is provided with flow passages 46, 48 and 50. Ring 44 is supported by a pan 52 which in turn is supported by a pan support 54. Pan support 54 may be pivotably connected to the casing 14 by pivot pin 56. A latch for securing the end of the pan support 54 in position at the end remote from pin 56 is provided but not shown. To control flow through the ring 18, a rotatable and vertically reciprocal refractory tube 58 may be provided as is conventional in the art.

In view of the above remarks, a detailed description of operation is not deemed necessary. From FIG. 1 it will be noted that coil 24 is generally dish-shaped. From FIG. 3, it will be noted that the coil 24 in plan view is generally C-shaped. It will be apparent to those skilled in the art that the coil 24 is electrically heated and may be connected through a rheostat to a source of electrical potential so that the temperature of the coil may be selectively varied to suit the particular type of glass and operating conditions, whereby the shield 20 may be heated above its normal temperature.

Tube 55 may have a solid refractory plunger 60 disposed therein. The plunger 60 is preferably supported from above for reciprocation toward and away from the orifice ring. The refactory tube 58 may be mounted for rotation and/or reciprocation relative to the ring 18.

The present invention may be embodied in other specific forms without departing from the spirit or essential attributes thereof and, accordingly, reference should be made to the appended claims, rather than to the foregoing specification as indicating the scope of the invention.

I claim:
1. A glass feeder having a refractory spout spaced inwardly of a casing, a metal heat shield between said casing and spout, electrical means for heating said shield to a temperature above its normal operating temperature, and means supporting an orfice ring adjacent said casing.

2. A feeder in accordance with claim 1 wherein said heating means includes an electrical heating coil secured to said shield along a curved portion of the shield so as to be generally dish-shaped.

3. A glass feeder in accordance with claim 2 wherein said heating coil is bent back on itself so as to provide a plurality of progressively smaller convolutions and is generally C-shaped in plan view.

4. A heater in accordance with claim 1 wherein said orifice ring has three flow passages therethrough, and a refractory plunger within said refractory spout, said plunger being disposed above said orifice ring, insulation between said shield and said refractory spout, and insulation between said shield and said casing.

5. A glass feeder having a refractory spout spaced inwardly of a casing, a refractory ring supported at its outer periphery by said spout, a metal heat-reflecting shield between said casing and spout, an electrical coil for heating said shield to a temperature above its normal operating temperature, said coil being secured to said shield along a curved portion of the shield and lying in the plane of said refractory ring, and means supporting an orifice ring immediately below said refractory ring.

6. A method of controlling flow of molten glass through an orifice ring on a refractory discharge spout of a molten glass feeder wherein a metal casing surrounds the spout comprising the steps of discharging three streams of molten glass through an orifice ring, interposing a heat reflective shield between the spout and casing above the plane of the orifice ring, and heating the shield to a temperature of between 100° and 400° above the normal operating temperature of the shield resulting from the temperature of the molten glass.

References Cited
UNITED STATES PATENTS
2,186,718   1/1940   Ferguson _____ 65—128

S. LEON BASHORE, Primary Examiner
S. R. FRIEDMAN, Assistant Examiner

U.S. Cl. X.R.
65—129, 221, 326, 328, 356